Figure 1:
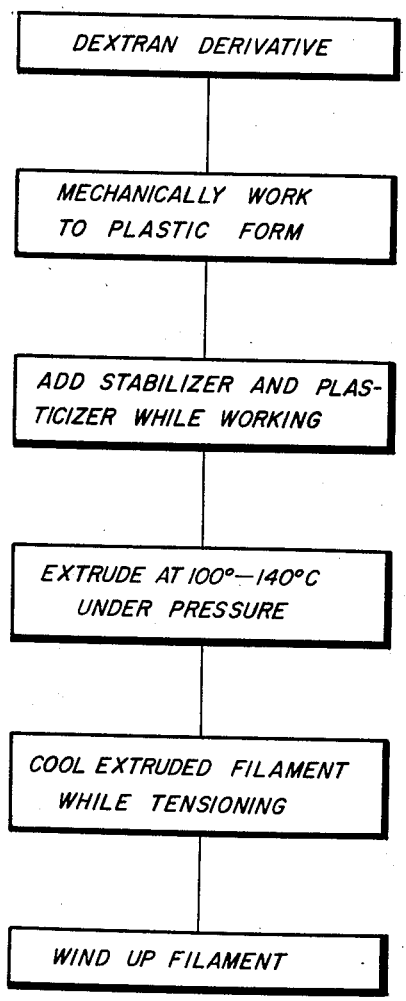
Figure 2:
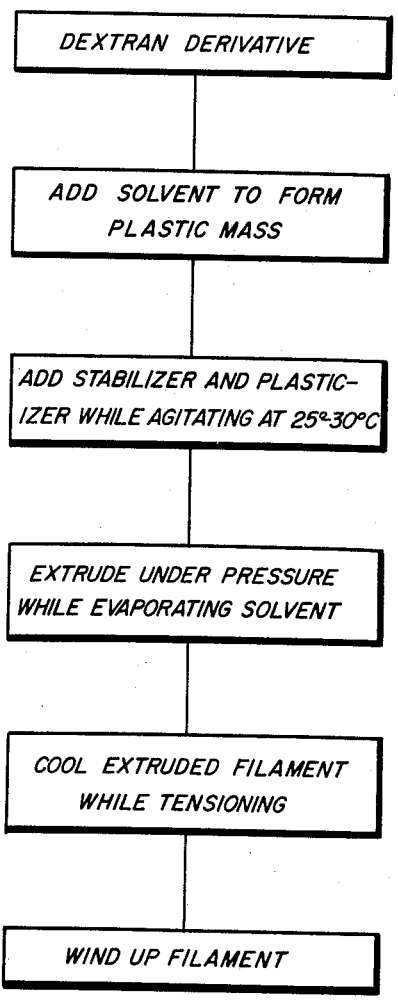

Nov. 24, 1959  A. E. BISHOP  2,914,415
FIBERS AND FILAMENTS FROM DEXTRAN DERIVATIVES
Filed March 19, 1957

INVENTOR
ALFRED E. BISHOP
BY Toulmin & Toulmin
ATTORNEYS

United States Patent Office 2,914,415
Patented Nov. 24, 1959

2,914,415

FIBERS AND FILAMENTS FROM DEXTRAN DERIVATIVES

Alfred E. Bishop, Pacific Palisades, Calif., assignor to The Commonwealth Engineering Company of Ohio, Dayton, Ohio Application March 19, 1957, Serial No. 647,113

2 Claims. (Cl. 106—162)

This invention relates to fibers of dextran ethers. More particularly, the invention relates to a composition comprising, as the major constituent a dextran ether, and adapted to be formed into fibers.

This application is a continuation-in-part of Serial No. 215,578, filed March 14, 1951, now U.S. Patent No. 2,789,915.

Dextran is a polysaccharide made up of anhydroglucose units linked at least predominantly 1,6 and which is biosynthesized from sucrose by the action of strains of bacteria such as those of the *Leuconostoc mesenteroides* and *L. dextranicum* types.

A culture of the bacteria, or the enzyme filtered from the culture, is inoculated into a sucrose-containing nutrient medium and the medium is incubated until the dextran is produced in maximum yield, and then precipitating the dextran from the fermentate by means of a water-miscible aliphatic alcohol or ketone brings down the dextran.

The native dextran thus obtained under conventional conditions has an extremely high molecular weight, as determined by light scattering measurements. As is known, this native dextran may be water-soluble or water-insoluble, depending on the strain of Leuconostoc used to effect the biosynthesis, which determines the ratio of 1,6 to non-1,6 linkages in the dextran, and thus the solubility or insolubility thereof in water, the solubility of the dextran in water increasing with increase in the percent 1,6 linkages in the molecule.

The starting material for use in practicing the present invention is a dextran ether produced, for instance, as disclosed in United States Patents Nos. 2,203,703; 2,203,-704; 2,203,705; 2,236,386; 2,344,179 and 2,344,180. The ethers are, at least in some instances, brittle materials in the dry state, have low tensile strengths, and have been generally regarded as unsuitable for the production of useful fibers.

One object of this invention is to provide fibers comprising a dextran ether.

Another object is to provide compositions comprising, as the major constituent, a dextran ether and which can be formed into useful fibers.

These and other objects of the invention are accomplished by rendering the dextran ether plastic and thereafter extruding the plastic mass under controlled conditions through a fiber-forming device having a suitable small orifice or plurality of orifices.

Plasticization of the dextran ether may be accomplished by kneading the dry ether with a suitable plasticizer as set forth below to obtain a mass of viscosity suitable for extrusion, or by incorporating the plasticizer into a solution of the dextran ether in a suitable solvent.

Either way, the mass is extruded under moderate temperature conditions to form a fine filament which is dried under tension and with cooling. By subjecting the filament to a stretching tension during cooling thereof, the molecules of the dextran ether are aligned with improvement in the flexibility and strength.

The dextran ethers may be obtained by reacting the native dextran, in the fermentate, with the selected etherifying agent. The reaction product comprises a mixture which includes, in addition to the ethers, corresponding derivatives of any excess sucrose or metabolic products remaining in the fermented culture medium. In some instances, this may be desirable because a blending of these various derivatives yields a product having a range of solubilities, which may be a desirable feature of the ultimate fibers.

The ethers are obtained by reacting the dextran with etherifying reagents such as ethyl chloride, diethyl sulfate, benzyl chloride and so on. The reaction takes place in an alkaline solution. The rate and extent of the reaction may be regulated by controlling the reaction time and temperature, as well as the pressure. The products may contain from 0.5 to 3.0 of the ether groups per anhydroglucose unit of the dextran. The physical characteristics of the end product, particularly the rigidity thereof, are influenced by the degree of substitution. The higher the D.S. with respect to ether groups, the greater the rigidity of the product.

The reactants are usually used in the ratio of 1.0 mole of the dextran to 3.5 to 6.0 mols of the etherifying agent and about 3.5 to 5.0 mols of an alkali such as sodium hydroxide. If the dextran is isolated from the fermentate prior to the etherification, it is generally necessary to add sufficient water to provide a 10% solution of the alkali.

The ethers are separated from the reaction mass by decantation or filtration, or if the ether is insoluble, by precipitation with alcohols or ketones, or even by steam distillation. The ethers are washed with water, preferably with mechanical agitation or kneading of the mass. Residual water is removed by drying, centrifuging, or working on a warm mill.

The dextran ether may be placed on a rolling mill or in a kneading type mixer, and worked into a mass of considerable pliability, after which the plasticizing agent or agents are worked in to produce a homogeneous mass of viscosity suitable for extrusion. The mass may be placed in the extrusion apparatus at room temperature and forced through a die having a temperature in the range of about 100–140° C. A pressure of approximately 80 lbs./sq. in. is usually used to cause the mass to flow through an orifice having an opening diameter of 0.0050 inch, but the pressure may be varied as required.

The foregoing procedure is used when the ether is highly substituted, e.g., contains from 2.0 to 3.0 ether groups per anhydroglucose unit, and is initially relatively rigid.

When the ether is less highly substituted e.g., when it contains from 0.5 to 1.9 ether groups per anhydroglucose unit, and is soluble in such solvents as methyl alcohol, denatured alcohol or acetone, the plasticizing agent may be added to a solution of the ether, and the solution, which has a viscous or syrup-like consistency dependent on the quantity of solvent used and the temperature, may be extruded as such. It is placed in the extrusion apparatus at a temperature of 20° C. to 40° C. above the boiling point of the solvent. Removal of the solvent is effected at this elevated temperature as the stream passes through the die of the extrusion device. If all of the solvent is not thus removed, a heated air gap is provided at the exit end of the die and the material is either passed over a dryer roll or over a drum maintained at a temperature of about 90 to 95° C.

When the filament is dry, it is then passed over a cooling drum maintained at about 15° C. to 20° C., whereby its temperature is lowered rapidly. From the cooling drum, it passes onto a winding roll, preferably rotating at a speed 20% to 30% greater than the cooling drum. This speed differential causes the cooled filament to be stretched and drawn out, resulting in an orientation or alignment of the molecules and improvement in the physical properties.

The filaments thus produced may be disrupted to staple fibers or combined with other filaments to form a yarn.

The ether may be an alkyl, hydroxyalkyl, or aralkyl ether.

Plasticizers which can be used with these ethers are phthalic, sebacic and phosphoric acid esters in which the substituents are butyl, octyl or cresyl radicals, castor oil, and hydrogenated castor oil, which plasticizers can be used in combination.

Other extrusion aids or modifiers of the filaments may be included in the mass or solution to be formed into the filaments. Such modifiers are shown in some of the examples below, being used in specific combinations which, however, can be interchanged in making up the extrusion compositions.

The invention will be more fully understood by reference to the accompanying flowsheet and the following examples which are given to illustrate the invention and are not intended as limitative.

*Example I*

Benzyl dextran produced as described hereinabove and in accordance with known methods, and having a D.S. of about 2.0, was plasticized on a rolling mill with 25.0 parts of dibutyl phthalate per 100 parts of the benzyl dextran.

*Example II*

The benzyl dextran of Example I was plasticized and compounded with the following ingredients on a rolling mill—

| | Parts by weight |
|---|---|
| Benzyl dextran | 100.0 |
| Adipic acid | 0.5 |
| Dibutylphthalate | 25.0 |
| Dibasic lead stearate | 2.5 |

*Example III*

Benzyl dextran containing an average of 2.5 benzyl groups per anhydroglucose unit was plasticized on a roll mill with 20 parts by weight of dioctylphthalate per 100 parts of the ether.

*Example IV*

The benzyl dextran of Example III was plasticized and compounded on a roll mill with the following ingredients—

| | Parts by weight |
|---|---|
| Benzyl dextran | 100.0 |
| Castor oil | 1.0 |
| Dioctyl phthalate | 20.0 |
| Aluminum stearate | 1.5 |

*Example V*

Hydroxyethyl dextran containing an average of 2.2 hydroxyethyl groups per anhydroglucose unit was plasticized on a roll mill by incorporating therein 25 parts of tricresyl phosphate per 100 parts of the ether.

Each of the foregoing compositions provides a plastic mass which when placed in an extrusion apparatus of conventional type, under a pressure of about 80 lbs./ sq. in. is extruded through an orifice having a diameter of about 0.0050 of an inch. The temperature of the die is held at about 100° C. to 140° C. to assure adequate flow through the orifice.

In each case, the filament advancing from the die is first drawn over a cooling roll and then over a winding roll operating at higher speed, to establish and maintain a differential and stretch the filament.

The tension results in an alignment of the molecules and, on complete setting, the filament is flexible and suitable for forming into a yarn.

*Example VI*

About 100 parts of ethyl dextran containing an average of 0.5 ethyl groups per anhydroglucose unit was dissolved in 50 parts of denatured alcohol and mixed with the following ingredients in parts by weight—

| | |
|---|---|
| Hydrogenated castor oil | 20.0 |
| Stearic acid | 1.0 |
| Basic lead carbonate | 2.5 |

*Example VII*

About 100 parts of the ethyl ether of Example VI were dissolved in 50 parts of denatured alcohol and 20 parts of dioctyl sebacate were added to the solution with stirring.

*Example VIII*

About 100 parts of beta-hydroxyethyl dextran containing an average of 1.0 b-hydroxyethyl groups per anhydroglucose unit were dissolved in 60 parts of acetone, and 25 parts of dioctyl sebacate were added to the solution.

*Example IX*

About 100 parts of the beta-hydroxyethyl dextran of Example VIII were dissolved in 60 parts of acetone and there were then added to the solution, in parts by weight,

| | |
|---|---|
| Dioctyl sebacate | 22.5 |
| Aluminum stearate | 0.5 |
| Tribasic lead sulfate | 1.5 |

*Example X*

About 100 parts of benzyl dextran containing an average of 0.8 benzyl group per anhydroglucose unit were dissolved in 65 parts of methanol. About 15 parts of dioctyl phthalate were added to the solution with stirring.

*Example XI*

About 100 parts of the benzyl dextran of Example X were dissolved in 65 parts of methanol and the following ingredients, in parts by weight, were added to the solution—

| | |
|---|---|
| Dioctyl phosphate | 15 |
| Dibutyl phthalate | 10 |
| Wax | 0.5 |
| Dibasic lead phosphite | 0.5 |

The viscous solutions of the foregoing examples were delivered to an extrusion apparatus having a small extrusion orifice and maintained at a temperature of 20° C. to 40° C. above the boiling point of the particular solvent contained therein. The mass was forced under pressure through a filament-forming die and then through a hot (temperature above the boiling point of the solvent) air gap. Evaporation of the solvent took place during the process.

When the solvent was completely removed, the filament was passed over a drier roll or drum maintained at 90° C. to 95° C. After leaving the drier, the filament was passed over a cooling drum maintained at about 15° C. to 20° C. The temperature of the filament was thus lowered rapidly.

The filament was then picked up by a winding roll operating at a surface speed 20% to 30% greater than that of the cooling drum, thus establishing a differential and stretching the filament in the cooled condition, which orients the molecules for improvement in the filament properties. The filament is then ready for disruption to staple fibers and threads in accordance with standard spinning and weaving practice.

The thread thus formed may be particularly adapted for surgical applications. For such uses, the components of the threads must be compatible with the body. In the foregoing examples, this consideration has dominated the selection of the ingredients.

As will be observed from the examples given, the filament forming composition may contain, in addition to the dextran ether and plasticizer, small amounts of other agents such as stabilizers and substances which adapt the filaments to special uses. Thus, threads formed from the filaments may be particularly suitable for surgical applications, in which case all of the substances contained in the filaments must be suitable for the surgical use. The plasticizers enumerated herein, as well as the other modifiers included in the compositions of certain of the examples, were selected for their suitability for such use. As already mentioned it is to be understood that while specific modifiers are shown in some of the compositions comprising specific dextran ethers, the modifiers are interchangeable. For instance, the aluminum stearate shown used in the composition of Example IV in which the filament-forming constituent is benzyl dextran can be used with the ethyl dextran-containing composition of Example VI as well, in place of the stearic acid and basic lead carbonate shown in the latter example.

It will be understood that while specific examples of the compositions have been given, some changes may be made therein without departing from the invention and that it is not intended to limit the latter except as defined in the appended claims.

What is claimed is:

1. As a new composition of matter adapted to be extruded into filaments and which consists of a plastic extrudable mass composed of the following constituents in parts by weight; 100 parts benzyl ether of dextran, 1.0 part of castor oil, 20.0 parts dioctyl phathalate, and 1.5 parts aluminum stearate.

2. A filament consisting of benzyl ether of dextran as the principal constituent, togther with approximately 1.5 parts per 100 benzyl ether of dextran of aluminum stearate and a plasticizing amount of dioctyl phthalate and castor oil, said dioctyl phthalate and castor oil being in the proportionate amounts of about 20 parts phthalate to 1 part castor oil.

References Cited in the file of this patent

UNITED STATES PATENTS

| | | |
|---|---|---|
| 2,203,705 | Stahley et al. | June 11, 1940 |
| 2,354,745 | Dreyfus | Aug. 1, 1944 |
| 2,671,779 | Gaver et al. | Mar. 9, 1954 |
| 2,789,915 | Bishop | Apr. 23, 1957 |

OTHER REFERENCES

Ott: "High Polymers," vol. 5 (Cellulose), 1943, page 761.